United States Patent
Kirsch et al.

(10) Patent No.: US 9,354,304 B2
(45) Date of Patent: May 31, 2016

(54) METHOD FOR CYCLICALLY MEASURING DISTANCES AND VELOCITIES OF OBJECTS USING AN FMCW RADAR SENSOR

(71) Applicants: Andreas Kirsch, Leonberg (DE); Michael Schoor, Stuttgart (DE)

(72) Inventors: Andreas Kirsch, Leonberg (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 14/152,264

(22) Filed: Jan. 10, 2014

(65) Prior Publication Data

US 2014/0253365 A1    Sep. 11, 2014

(30) Foreign Application Priority Data

Jan. 14, 2013    (DE) .......................... 10 2013 200 404

(51) Int. Cl.
| | |
|---|---|
| G01S 13/22 | (2006.01) |
| G01S 13/42 | (2006.01) |
| G01S 13/93 | (2006.01) |
| G01S 13/58 | (2006.01) |
| G01S 13/34 | (2006.01) |
| G01S 13/00 | (2006.01) |

(52) U.S. Cl.
CPC .................. G01S 13/58 (2013.01); G01S 13/34 (2013.01); G01S 13/42 (2013.01); G01S 13/931 (2013.01)

(58) Field of Classification Search
CPC ......... G01S 13/02; G01S 13/06; G01S 13/08; G01S 13/32; G01S 13/34; G01S 13/50; G01S 13/58; G01S 13/88; G01S 13/93; G01S 13/931; G01S 13/10; G01S 13/24; G01S 13/341; G01S 13/342; G01S 13/343; G01S 13/345; G01S 13/347; G01S 13/12; G01S 13/22; G01S 13/42; G01S 13/583
USPC .................. 342/27, 28, 70–72, 104–115, 118, 342/128–133, 175, 192–197
See application file for complete search history.

(56) References Cited

U.S. PATENT DOCUMENTS

| | | | | |
|---|---|---|---|---|
| 4,079,377 | A | * 3/1978 | zur Heiden | ........... G01S 13/343 342/109 |
| 5,309,160 | A | 5/1994 | Powell et al. | |
| 6,492,938 | B1 | 12/2002 | Alland | |
| 7,508,337 | B2 | * 3/2009 | Morinaga | ............... G01S 13/34 342/109 |

(Continued)

FOREIGN PATENT DOCUMENTS

| | | |
|---|---|---|
| DE | 101 33 962 | 2/2003 |
| EP | 1 925 948 | 5/2008 |
| WO | WO 02/31529 | 4/2002 |

*Primary Examiner* — Bernarr Gregory
(74) *Attorney, Agent, or Firm* — Norton Rose Fulbright US LLP

(57) ABSTRACT

In a method for cyclically measuring distances (d) and relative velocities (v) of objects using an FMCW radar sensor, the frequency (f) of a transmitted signal of the radar sensor is periodically modulated, each period (P) including at least two differing modulation patterns, a relationship between distance (d) and velocity (v) of the object being derived from a signal received for a single modulation pattern, and the signals received for multiple modulation patterns being adjusted to one another in order to determine one value each for the distance and the velocity per each measuring cycle. For the adjustment between a signal obtained for a modulation pattern in the instantaneous measuring cycle and the signal(s) obtained for other modulation patterns, the signals from at least one previous measuring cycle are utilized.

10 Claims, 5 Drawing Sheets

(56) References Cited

U.S. PATENT DOCUMENTS

| | | | |
|---|---|---|---|
| 7,567,202 B2 * | 7/2009 | Pearson | G01S 13/24 342/114 |
| 7,786,926 B2 * | 8/2010 | Hilsebecher | G01S 13/343 342/104 |
| 7,786,927 B2 * | 8/2010 | Kondoh | G01S 13/34 342/109 |
| 8,026,843 B2 * | 9/2011 | Winkler | G01S 13/345 342/109 |
| 8,031,106 B2 * | 10/2011 | Szajnowski | G01S 13/347 342/109 |
| 8,390,506 B2 * | 3/2013 | Focke | G01S 13/345 342/112 |
| 9,024,809 B2 * | 5/2015 | Testar | G01S 13/343 342/109 |

* cited by examiner

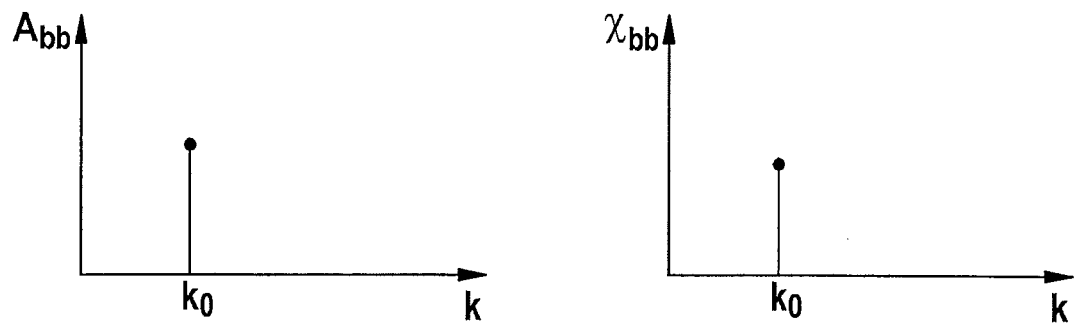
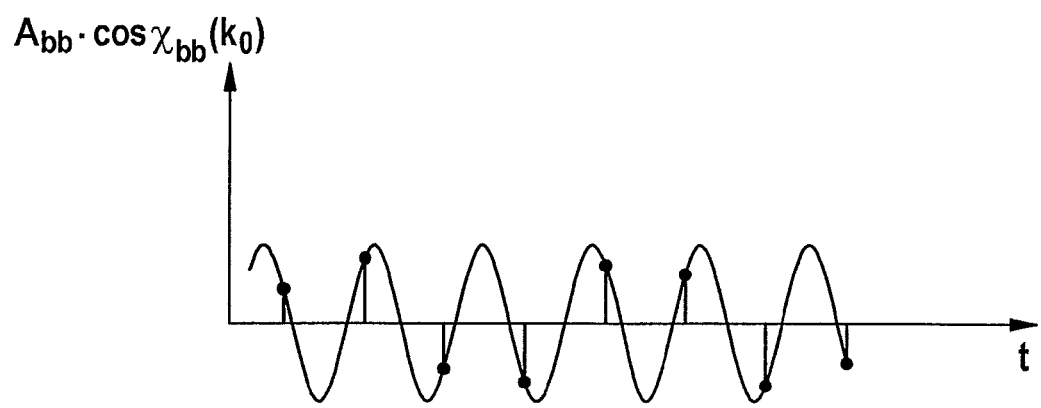
Fig. 3
Fig. 4

METHOD FOR CYCLICALLY MEASURING DISTANCES AND VELOCITIES OF OBJECTS USING AN FMCW RADAR SENSOR

BACKGROUND OF THE INVENTION

1. Field of the Invention

The present invention relates to a method for cyclically measuring distances and velocities of objects using an FMCW radar sensor in which the frequency of a transmitted signal of the radar sensor is periodically modulated, each period including at least two differing modulation patterns, a relationship between distance and velocity of the object being derived from a signal received for a single modulation pattern, and the signals received for multiple modulation patterns being adjusted to one another in order to determine one value each for distance and velocity per each measuring cycle.

2. Description of the Related Art

Radar sensors are used in driver assistance systems for motor vehicles, e.g., in ACC (adaptive cruise control) systems or safety systems, e.g. collision warning systems, and are used to determine the positions and the relative velocities of objects, so that a driving situation may be recognized. For example, the velocity of the host vehicle may be adapted to the velocity of a preceding vehicle in an ACC system as part of an adaptive cruise control, and the distance from the preceding vehicle may be controlled to a suitable value. A safety system may, for example, be configured to automatically initiate a braking operation when a risk of an imminent collision has been recognized.

FMCW (frequency modulated continuous wave) radar sensors are known in which the transmission frequency of a continuous radar signal is modulated in a ramped manner. By mixing a received signal with the transmitted signal, a baseband signal is generated which is subsequently evaluated.

In an FMCW radar sensor, each radar object is plotted in the frequency spectrum of the baseband signal in the form of a peak whose position is a function of the Doppler shift and the propagation time of the radar signals, so that it is not yet possible to unambiguously determine the relative velocity and the distance from the baseband signal assigned to a frequency modulation ramp. The frequency of an obtained peak rather establishes a relationship between the velocity (relative velocity) and the distance in the form of a linear correlation.

The term "linear" is to be understood to mean in the following that the correlation designated this way may include a linear factor and an additive term.

In the case of the FMCW method, multiple frequency modulation ramps having different ramp slopes are necessary for identifying multiple radar objects and for estimating their relative velocities and distances. By adjusting the different received relationships obtained for the individual frequency ramps, relative velocity v and distance d of a radar object may be computed. This adjustment is also referred to as matching and corresponds to a search for points where the straight lines in the d-v space intersect. The FMCW method is particularly efficient if only a few radar objects are detected.

Radar sensors are also known which work according to the method of the chirp sequence modulation in which the transmitted signal includes a sequence of identical frequency-modulated signal pulses (chirps). The modulation pattern therefore includes a complete set of consecutive chirps and not of a single modulation ramp. This is a pulse Doppler method in which radar objects are initially separated according to their distances, and subsequently location changes and thus velocities of the radar objects are ascertained based on the differences in the phase positions between the reflections of the individual signal pulses.

In known FMCW methods, the cycle time, i.e., the duration of a single measuring cycle, matches the cycle duration of the frequency modulation. A certain number of frequency patterns is transmitted within one measuring cycle and the received signals are recorded and evaluated for all received frequency patterns. The cycle time is therefore composed of the time which is needed to transmit the frequency pattern and an additional computing time which a processor requires for processing the received signals and for computing the distance and velocity data.

In the case of safety-relevant assistance functions, it is important, however, that the traffic events may be tracked with a preferably high time resolution. This means that the cycle time should be as short as possible. Since it is not possible to shorten the duration of the modulation patterns for measurement accuracy reasons, the cycle time may only be shortened by shortening the computing time. The utilization of more powerful and thus more expensive processors is necessary to accomplish this.

BRIEF SUMMARY OF THE INVENTION

The object of the present invention is to provide a method which makes it possible to shorten the cycle time at a given computing power and allows for an extension of the time available for the evaluation and thus the utilization of less expensive processors at a given cycle time.

This object is achieved according to the present invention in that, for the adjustment between a signal obtained for a modulation pattern in the instantaneous measuring cycle and the signal(s) obtained for other modulation patterns, one resorts to the signals from at least one previous measuring cycle.

The present invention uses the fact that due to the inertia of the involved motor vehicles, the velocities change only slightly from measuring cycle to measuring cycle, so that only those distances are relevant which go through a significant change from one measuring cycle to the next. The velocity information is therefore not falsified significantly if data from one or multiple directly preceding measuring cycles are used instead of data from the instantaneous measuring cycle. If N different modulation patterns are used, M is the time needed to transmit a single modulation pattern, and T is the computing time needed to evaluate a single modulation pattern, then cycle time Z in the conventional method is obtained by:

$$Z=N*(M+T).$$

In the method according to the present invention, the cycle time may be shortened to:

$$Z=M+T$$

by resorting to the last (N−1) measuring cycles for the adjustment.

This results in a cycle time which is shorter by (N−1)*(M+T).

This shortening of the cycle time in turn results in the time interval between the different modulation patterns also being correspondingly small, thus further reducing the error in the velocity data.

The present invention is particularly advantageous for FMCW methods which use the above-mentioned principle of chirp sequence modulation. Since in the case of these methods, the velocity information is obtained from the differences in the phase position of the signals obtained for consecutive modulation patterns, the limiting factor is not necessarily the accuracy with which the velocity may be determined, but rather an ambiguity which results from the Nyquist Shannon sampling criterion. Since the phase position of the signals changes periodically, but the signal is sampled only selectively at a certain sampling frequency, it may no longer be excluded at high velocities for a given change in phase φ that the "true" phase change was φ+2π or φ+4π, etc. Therefore, a set of possible velocities is obtained which are separated from one another by a fixed velocity interval. In the case of the method according to the present invention, the matching is considerably simplified by the fact that it may virtually be excluded that the velocity of an object has changed within the short time period from one measuring cycle to the next by a whole velocity interval (according to phase change 2 π).

BRIEF DESCRIPTION OF THE DRAWINGS

FIG. 3 shows amplitude $A_{bb}$ and phase $\chi_{bb}$, plotted schematically against frequency bin k, of the obtained complex frequency spectrum in polar coordinates.

FIG. 4 schematically shows with the aid of a solid line the course over time, which corresponds to a harmonic oscillation, of the real part of the spectrum $A_{bb}*\cos \chi_{bb}(k_0)$ at frequency position $k_0$ of the radar object in the frequency spectra during the course of the sequence of the fast ramps.

DETAILED DESCRIPTION OF THE INVENTION

Figure 1:
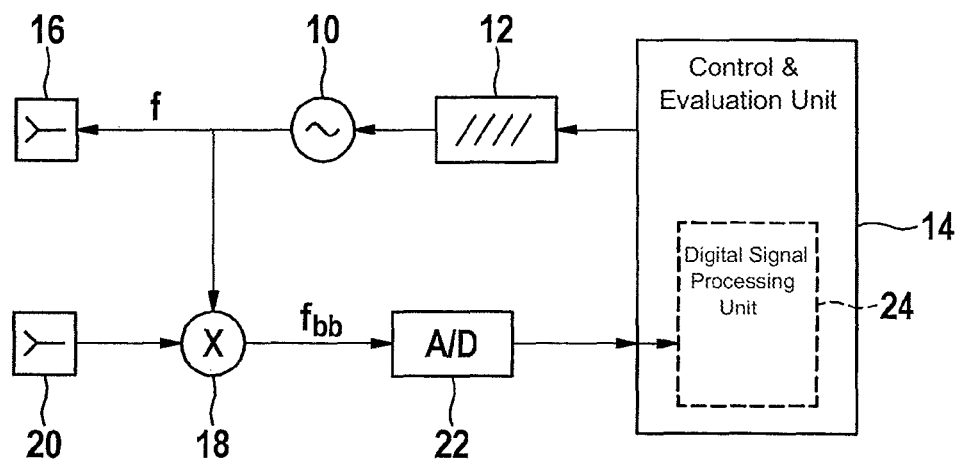
FIG. 1 schematically shows the design of a radar sensor system for motor vehicles.

FIG. 1 schematically shows the design of a radar sensor system for motor vehicles. The system includes a voltage-controlled high-frequency (HF) oscillator 10 for generating a transmitted signal. The frequency of HF oscillator 10 is controlled by a frequency modulation device 12 which, in turn, is controlled by a control and evaluation unit 14. An output of HF oscillator 10 is connected to at least one transmitting antenna element 16 for emitting a transmitted signal of the radar sensor system.

Furthermore, an output of HF oscillator 10 is connected to a mixer 18. This mixer is configured for mixing a received signal, received from a receiving antenna element 20, with the transmitted signal in order to generate a measuring signal in the form of a baseband signal. The baseband signal is digitized with the aid of an analog/digital converter 22 and supplied to control and evaluation unit 14. The mixing and digitizing is carried out while keeping the phase relations between the transmitted signal and the received signal. Control and evaluation unit 14 includes a digital signal processing unit 24 for evaluating the course over time of the frequency of the baseband signal.

Frequency modulation device 12 is configured to periodically modulate the transmitted signal using a sequence of modulation patterns. In the example provided, each modulation pattern within one sequence of frequency ramps (chirps) includes the same slope and the same lift.

Figure 2:
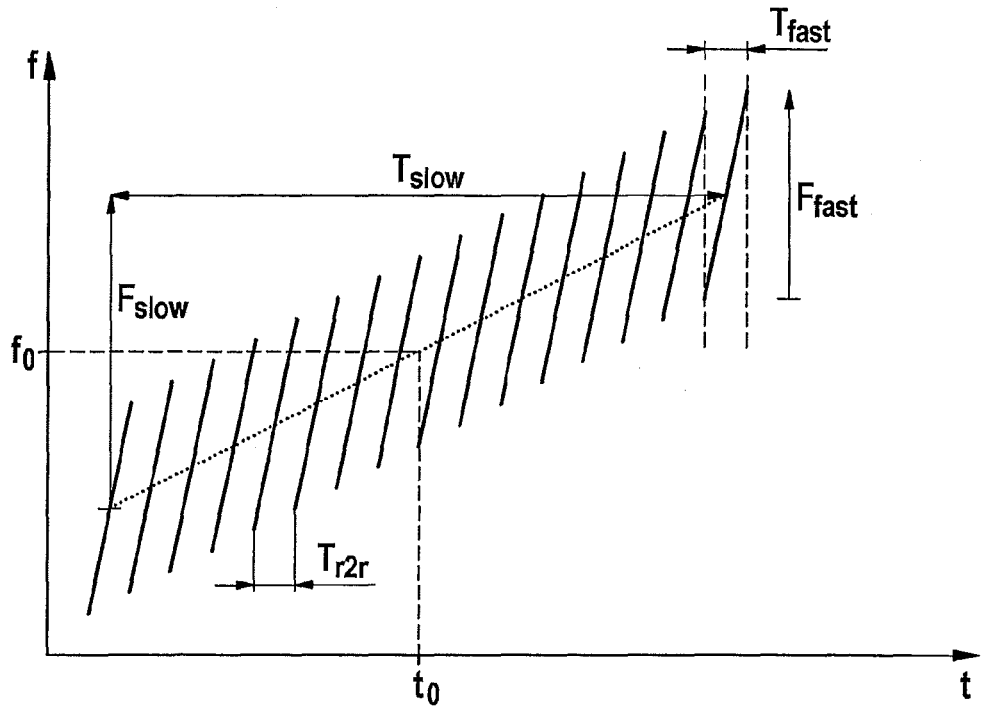
FIG. 2 shows a general representation in which the mean frequency of the individual frequency ramps, which are also referred to in the following as fast ramps, changes in the course of the sequence.

In FIG. 2, frequency f of a transmitted signal is plotted against time t, as an example based on a sequence of frequency ramps, each of which has a lift $F_{fast}$ and a time duration $T_{fast}$. The individual frequency ramps are consecutive at a time interval $T_{r2r}$ ("ramp-to-ramp"). In the example shown in FIG. 2, $T_{fast}$ equals $T_{r2r}$, so that the individual frequency ramps are directly consecutive.

FIG. 2 shows a general representation in which the mean frequency of the individual frequency ramps, which are also referred to in the following as fast ramps, changes in the course of the sequence. In particular, the mean frequency of the fast ramps in turn describes a linear frequency ramp having mean frequency $f_0$ at a point in time $t_0$. This frequency ramp is also referred to in the following as a slow ramp. It has a frequency lift $F_{slow}$ at a ramp duration $T_{slow}=(N_{slow}-1)*T_{r2r}$, $N_{slow}$ referring to the number of the fast ramps.

In the event that the slow ramp has frequency lift 0, the fast ramps of the sequence are identical, i.e., describe identical frequency courses.

In one modulation period, two or more differing sequences of fast ramps are used, the fast ramps (chirps) each having the same frequency lift $F_{fast}$, the same ramp duration $T_{fast}$, and the same time interval $T_{r2r}$ between the ramps within the particular sequence. The at least two sequences within one modulation period may, for example, differ by different values of the absolute value and/or the sign of frequency lift $F_{fast}$ of the fast ramps, different ramp durations of the fast ramps, different ramp repetition times $T_{r2r}$ of the fast ramps, different mean frequencies $f_0$ of the slow ramps, a different number $N_{slow}$ of the fast ramps and/or different frequency lifts $F_{slow}$ of the slow ramps.

For the sake of simplification, the evaluation of the measuring signal is initially explained in the following for a single sequence of fast ramps of the transmitted signal.

The frequency of the transmitted signal is, for example, in the range of 76 GHz. For example, the mean frequency of the slow ramp may be 76 GHz.

In the baseband signal supplied by mixer 18, each fast ramp in the sequence is assigned a partial signal having duration $T_{fast}$. Here, it may be assumed that the signal propagation time is small compared to ramp duration $T_{fast}$ for a radar object in the detection range of the radar sensor system.

In a first step of the evaluation, a frequency spectrum of at least one partial signal is evaluated. The partial signal of the baseband signal, which corresponds to a fast ramp, is sampled, i.e., digitized, on a number $N_{fast}$ of equidistant points in time, and a frequency spectrum of the partial signal is determined. The frequency spectrum is computed, for example, by computing a Fast Fourier Transform (FFT).

FIG. 3 shows amplitude $A_{bb}$ and phase $\chi_{bb}$, plotted schematically against frequency bin k, of the obtained complex frequency spectrum in polar coordinates.

For a signal which is reflected from a single radar object, a peak having amplitude $A_{bb}(k_0)$ is, for example, obtained in frequency bin $k_0$, this peak being assigned a corresponding phase $\chi_{bb}(k_0)$. Frequency bin $k_0$ in this case denotes the frequency position of the radar object in the relevant frequency spectrum of the partial signal.

In the case of a linear frequency modulation of the transmitted signal, the frequency position of a peak assigned to a radar object is composed of a sum of two terms, the first term being proportional to the product of distance d of the radar object from the radar sensor and ramp lift $F_{fast}$ and the second term being proportional to the product of relative velocity v of the radar object, the mean frequency of the fast ramp, and ramp duration $T_{fast}$. This corresponds to the FMCW equation $$k_0 = (2/c)(d_{0,r} F_{fast} + f_{0,r} v_{0,r} T_{fast}),$$

c being the speed of light, $d_{0,r}$ being the object distance at the mean point in time of the rth ramp, $r=1, 2, \ldots, N_{slow}$, and $f_{0,r}$ being the mean frequency of the rth ramp, and $v_{0,r}$ being the relative velocity of the radar object at the mean point in time of the rth fast ramp. The ascertained frequency position of the peak thus corresponds to a linear relationship between relative velocity v and distance d of the radar object. This relationship represents a first piece of information about the relative velocity and the distance of the radar object. It is in particular a function of ramp lift $F_{fast}$, ramp duration $T_{fast}$, and mean frequency $f_{0,r}$ of the fast ramps.

In the case of not excessively high relative velocities v and accelerations of a radar object, approximately the same frequency position of the peak results during the sequence of the fast ramps, and in the following, $k_0$ is to denote this mean frequency bin of the radar object across all fast ramps of the sequence.

Phase $\chi_{bb}(k_0)$, at frequency position $k_0$, assigned to the peak is particularly susceptible to changes in the distance of the radar object during the pass through the sequence of fast ramps. Consequently, a change in distance by half of the wavelength of the radar signal already results in a phase shift by a whole period of the oscillation.

FIG. 4 schematically shows with the aid of a solid line the course over time, which corresponds to a harmonic oscillation, of the real part of the spectrum $$A_{bb} * \cos \chi_{bb}(k_0)$$

at frequency position $k_0$ of the radar object in the frequency spectra during the course of the sequence of the fast ramps. The illustrated harmonic oscillation corresponds here to a case without acceleration of the radar object.

In the case of a radar signal frequency of approximately 76 GHz, the wavelength is approximately 4 mm. In the case of a relative velocity of 86 km/h, correspondingly 24 m/sec, the phase therefore changes at a frequency of 12,000 Hz. A peak corresponding to this frequency is expected in the frequency spectrum of the course over time of the real part, the course over time corresponding to the consecutive fast ramps; each ramp corresponds to a sampling value of the course over time. If, due to an excessively low sampling frequency of the phase changes, i.e., an excessively great ramp sequence period $T_{r2r}$, the Nyquist Shannon sampling theorem is violated, the frequency of the phase changes cannot be unambiguously determined. FIG. 4 schematically shows such an undersampling. The values of the real part are marked in the mean points in time of the particular fast ramps. The frequency of the phase changes, determined with the aid of a Fourier analysis, e.g., a computation of an FFT, at the frequency position of the radar object in the frequency spectra of the fast ramps is therefore ambiguous. A Fourier analysis is in this case in particular understood to mean the computation of at least one Fourier coefficient of a Fourier series.

The frequency position of the harmonic oscillation which corresponds to the phase change may be indicated by its frequency bin $l_0$ and is composed approximately additively of a term which is proportional to mean distance d and ramp lift $F_{slow}$ of the slow ramp and a term which is proportional to mean relative velocity v, ramp duration $T_{slow}$ of the slow ramp, and mean frequency $f_0$ of the slow ramp. This in turn corresponds to an FMCW equation for the slow ramp:

$$l_0 = (2/c)(d F_{slow} + v T_{slow} f_0)$$

The ascertained frequency position thus generally, i.e., in the case of a ramp lift of slow ramp $F_{slow} \neq 0$, results in a linear relationship between the relative velocity and the distance of the radar object, which is, however, ambiguous with regard to relative velocity v and distance d. This relationship represents a second piece of information about the relative velocity and the distance of the radar object. In special case $F_{slow} = 0$, a slow ramp is still involved; it has slope 0 and provides the second piece of information only about velocity v. This piece of information is unambiguous with regard to relative velocity v, except for integral multiples of the product of half the wavelength and sampling frequency $1/T_{r2r}$ of the slow ramp.

Figure 5:
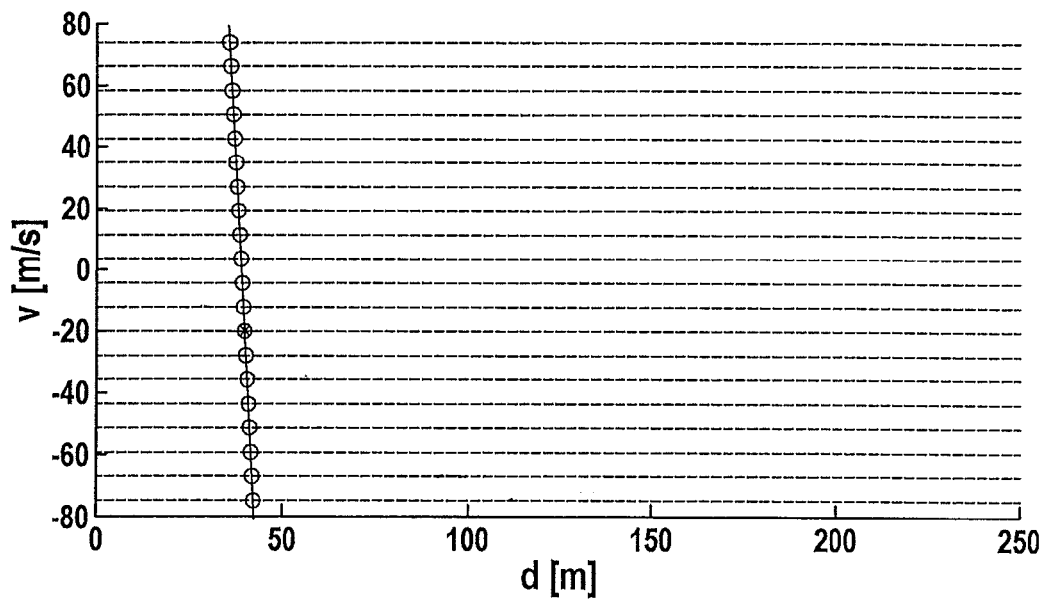
FIG. 5 shows as an example the piece of information, which results from the evaluation of the measuring signal to a sequence of frequency ramps, about relative velocity v and distance d.

FIG. 5 shows as an example the piece of information, which results from the evaluation of the measuring signal to a sequence of frequency ramps, about relative velocity v and distance d. The parameters of the frequency modulation are the following: $F_{fast} = 425$ MHz, $F_{fast} = 0.25$ ms, each fast ramp is sampled at $N_{fast} = 512$ sampling points in time; the frequency lift of the slow ramp is $F_{slow} = 0$; the time interval of the fast ramp is $T_{r2r} = 0.25$ ms; the number of fast ramps, i.e., the number of sampling points in time of the slow ramp, is $N_{slow} = 16$, thus resulting in a time duration of the slow ramps of $T_{slow} = 4$ ms. The detected radar object has a distance of d=40 m and a relative velocity v=−20 m/s.

The evaluation of a frequency spectrum of a partial signal results in a straight line which is tilted with regard to the vertical line, corresponding to a linear relationship between relative velocity v and distance d. Since the ramp lift of the slow ramp is $F_{slow} = 0$, an ambiguous value is obtained for relative velocity v from the Fourier analysis of the values of the frequency spectra of the partial signals at frequency position $k_0$ of the radar object, corresponding to the horizontal, dashed lines, which are at a constant distance from one another, in the diagram shown in FIG. 5. This ambiguous value represents the second piece of information about the relative velocity. By linking the first piece of information and the second piece of information and by taking into account the above-mentioned ambiguity, potential value pairs (v, d) result. In FIG. 5, the value pairs are identified by circles which illustrate a tolerance range for carrying out the adjustment. The real target is marked at v=−20 m/s by a star.

An unambiguity of the ascertainment of relative velocity and distance of the radar object may be established by taking into account another first piece of information about the relative velocity and the distance and/or another second piece of information about the relative velocity and, optionally, the distance.

Figure 6:
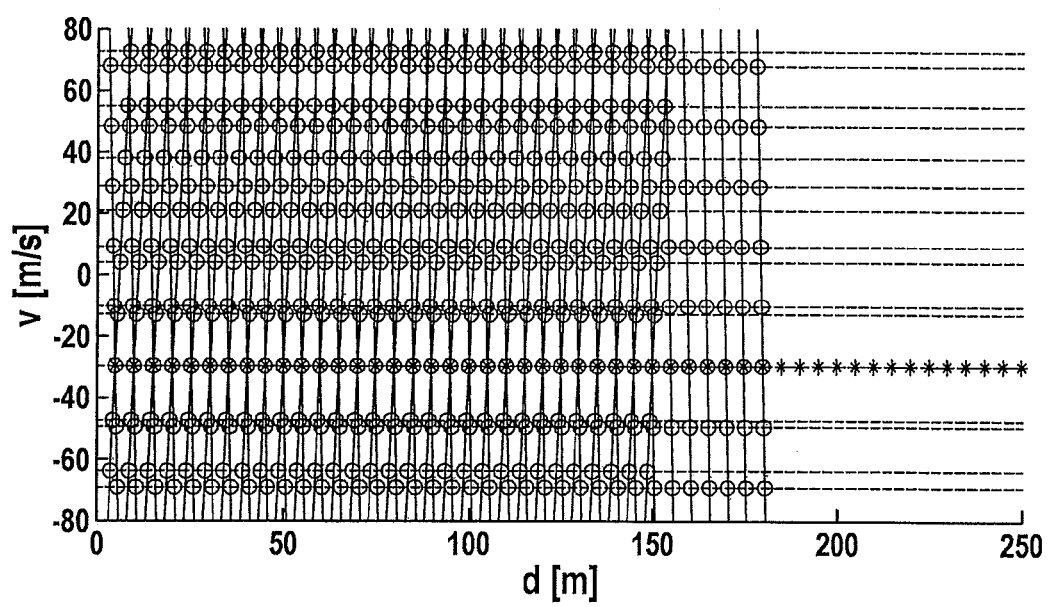
FIG. 6 schematically illustrates an unambiguous determination of relative velocities and distances of radar objects when two different modulation patterns are used in each modulation period.

FIG. 6 schematically illustrates an unambiguous determination of relative velocities and distances of radar objects when two different modulation patterns are used in each modulation period.

The parameters of the first modulation pattern are the following: $F_{fast}$=425 MHz, $T_{fast}$=0.10 ms, $N_{fast}$=1024, $F_{slow}$=0, $T_{r2r}$=0.10 ms, $N_{slow}$=32, thus resulting in $T_{slow}$=3.2 ms.

The parameters of the second modulation pattern are the following: $F_{fast}$=−250 MHz, $T_{fast}$=0.115 ms, $N_{fast}$=512, $F_{slow}$=0, $T_{r2r}$=0.115 ms, $N_{slow}$=32, thus resulting in $T_{slow}$=3.68 ms.

In this example, it is assumed that a series of radar objects is present at a relative velocity of v=−30 m/s in the distance range of d=5 m to d=250 m, the radar objects being spaced apart from one another by 5 m. These radar objects may be stationary targets, for example, which are being approached by the host motor vehicle at a velocity of 30 m/s.

The linear relationships between v and d differ for the two modulation patterns. The first modulation pattern provides a group of parallel, falling straight lines, one straight line per object. Accordingly, the second modulation pattern provides a group of rising straight lines. Furthermore, the second pieces of information, about velocity v of the radar object ascertained from the two modulation patterns, have different ranges of ambiguity.

In FIG. 6, the points where the straight lines intersect are identified by circles as in FIG. 5. The adjustment of the signals obtained from the two modulation patterns takes place in that those values for relative velocity v and distance d are searched for which the points of intersection of the straight lines provided by the two modulation patterns match best. In the example provided, relative velocity v=−30 m/s is obtained for all objects.

The chain of stationary radar objects may be resolved at a relative velocity of v=−30 m/s and detected up to a distance of 150 m.

In order to make the method more robust for situations in which multiple objects having different relative velocities are located at the same time, it is advantageous to work with at least three different modulation patterns per modulation period instead of with only two different modulation patterns. For example, one could work with modulation patterns which are nested into one another, so that one chirp of the first modulation pattern is initially followed by one chirp of the second and the third modulation patterns prior to the next chirp of the first modulation pattern. The adjustment of the signals and the computation of the distances and relative velocities would then have to take place at the end of the modulation period, so that the duration of the modulation period would simultaneously be the cycle time, i.e., the duration of the measuring cycle.

Figure 7:
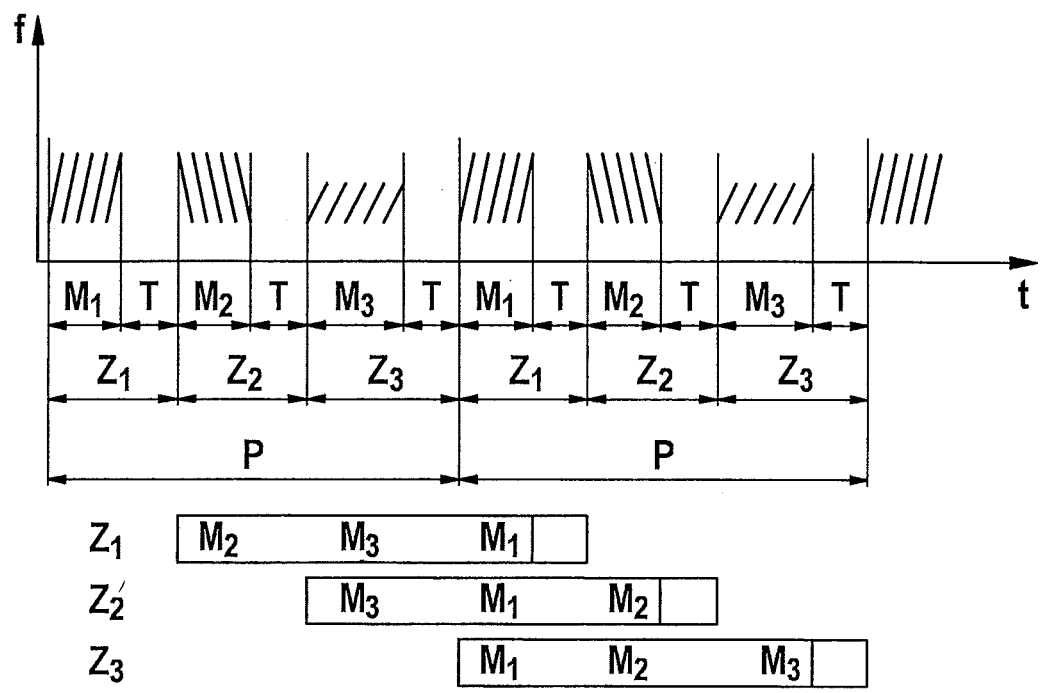
FIG. 7 shows frequency f of the transmitted signal plotted against time t for two complete modulation periods P, in each of which modulation periods the frequency is modulated according to three different modulation patterns $M_1$, $M_2$, and $M_3$.

In order to achieve a shorter cycle time, a different cycle pattern, which is illustrated in FIG. 7, is employed according to the present invention. In this case, frequency f of the transmitted signal is plotted against time t for two complete modulation periods P. In each modulation period P, the frequency is modulated according to three different modulation patterns $M_1$, $M_2$, and $M_3$. Each modulation pattern is followed directly by a computing time interval of length T; the baseband signal obtained for the relevant modulation pattern is evaluated within this interval.

Within each computing time interval, an adjustment of the results obtained for the last three modulation patterns also takes place. FIG. 7 shows this symbolically for the computing time interval in the second modulation period. This modulation period includes three measuring cycles $Z_1$, $Z_2$ and $Z_3$. During cycle $Z_1$, the result (the group of straight lines in the v-d diagram) obtained for modulation pattern $M_1$ during the instantaneous measuring cycle is adjusted using the results obtained for modulation patterns $M_2$ and $M_3$ during the two preceding measuring cycles (within preceding modulation period P). With the aid of this adjustment, an unambiguous value pair, which may be output at the end of this measuring cycle, is obtained for each object for distance and relative velocity. Accordingly, during cycle $Z_2$, the result obtained for modulation pattern $M_2$ in this cycle is adjusted using the result for directly preceding modulation pattern $M_1$ and modulation pattern $M_3$ preceding the latter. The procedure is similar in the case of cycle $Z_3$.

In this way, updated values are obtained for the distance and the relative velocity of each object already after one cycle time which is composed only of the duration of a single modulation pattern and computing time T.

Figure 8:
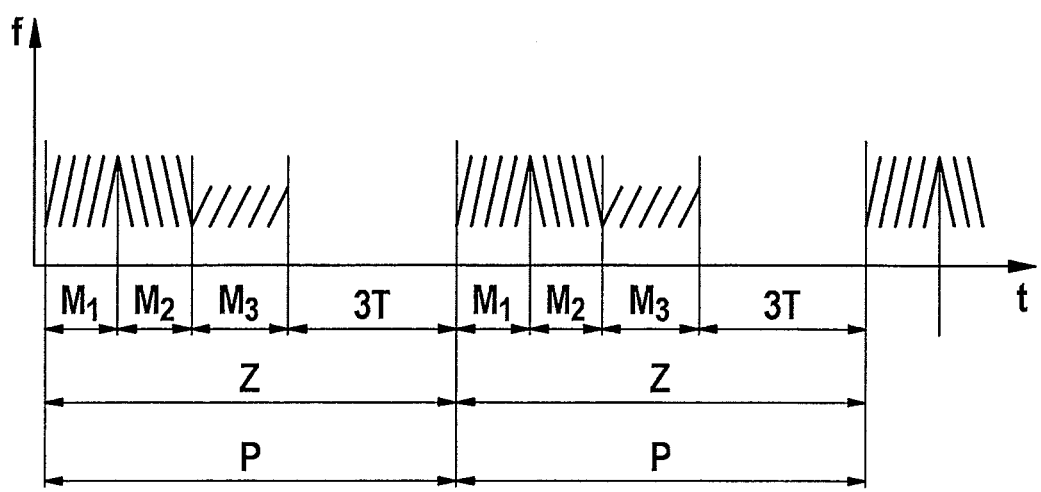
FIG. 8 shows a cycle diagram for a conventional method in which the duration of a measuring cycle Z (the cycle time) matches the duration of modulation period P, and the results for the three modulation patterns $M_1$, $M_2$, and $M_3$, which are in the same modulation period P, are adjusted to one another in each measuring cycle.

In comparison, FIG. 8 shows a cycle diagram for a conventional method in which the cycle time, i.e., the duration of a measuring cycle Z, matches the duration of modulation period P, and the results for the three modulation patterns $M_1$, $M_2$, and $M_3$, which are in the same modulation period P, are adjusted to one another in each measuring cycle. The three modulation patterns are not nested in this case, but follow each other consecutively. The computing time interval has in this case length 3 T, since all three modulation patterns must be evaluated upon receipt of all data.

It is apparent that the cycle time in FIG. 8 is considerably longer than any of the cycle times of the method according to the present invention in FIG. 7.

In the example shown in FIG. 7, cycles $Z_2$ and $Z_3$ have different durations because associated modulation patterns $M_2$ and $M_3$ also have slightly different durations. In practice, it would generally be arranged, however, that all measuring cycles have the same duration. In this case it must be taken into account that the number of fast ramps per modulation pattern will be significantly greater in practice than in the simplified example provided here. Different durations of the fast ramps may be compensated for by adjusting the number of the fast ramps within the slow ramp.

Figure 9:
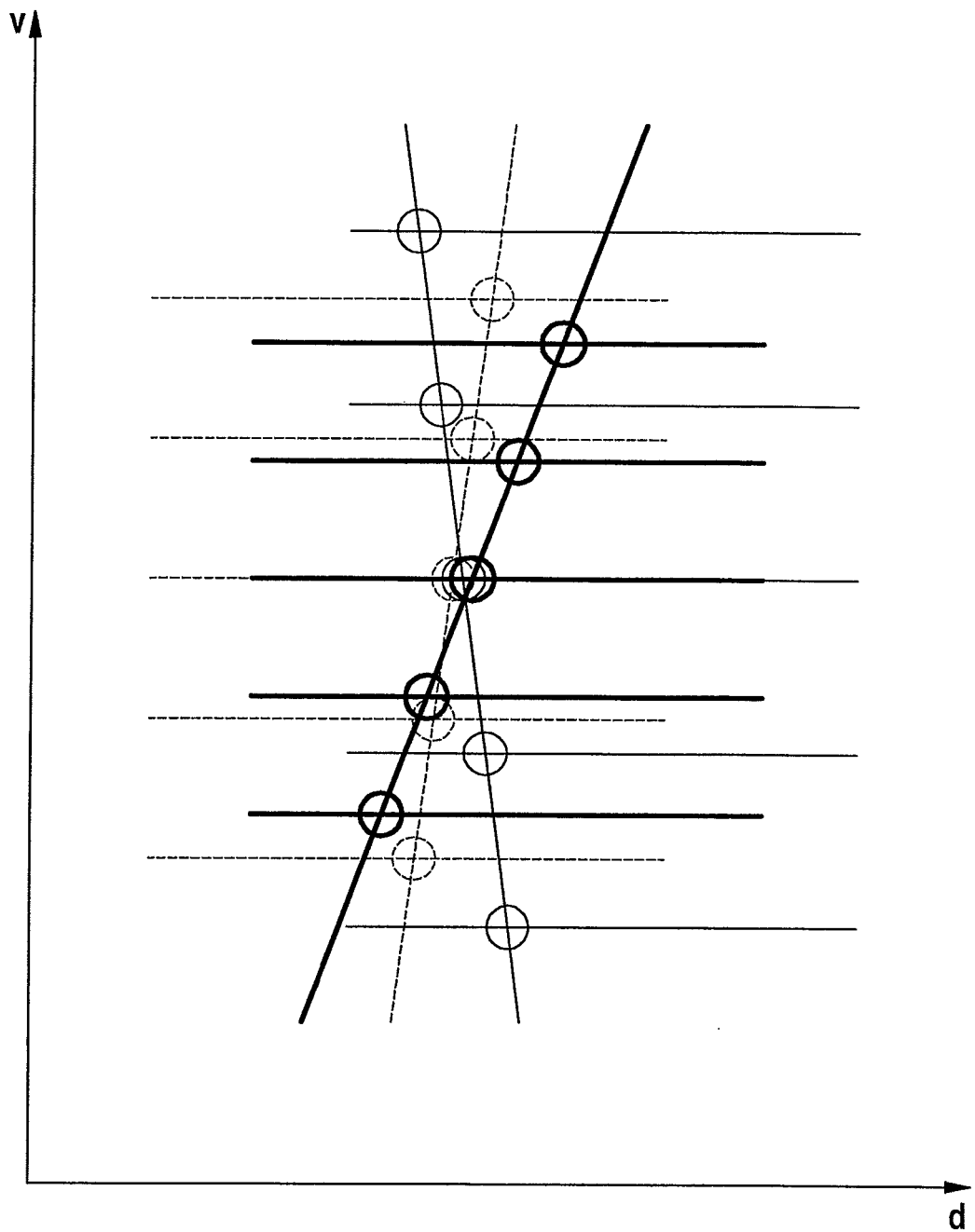
FIG. 9 illustrates the results obtained for three different modulation patterns for a single object in a velocity-distance diagram.

The method according to the present invention, however, results in the time intervals between individual modulation patterns $M_1$, $M_2$, and $M_3$ being slightly greater than in the related art. Accordingly, slightly greater differences in the intervals may in particular occur from measuring cycle to measuring cycle. This effect is illustrated in FIG. 9, where the results obtained for three different modulation patterns are illustrated for a single object in a v-d diagram. Since distance d has changed in the course of three measuring cycles, within which these data were obtained, the corresponding straight lines are slightly shifted against one another alongside of the d axis, so that a certain deviation in the d direction is still present even in the case of that relative velocity which provides the best match between the points where the straight lines intersect. However, the relative velocity which provides the best match is clearly distinguishable from the other relevant relative velocities, so that the reliability of the method is not compromised. For monitoring purposes, the shift of the points of intersection of the straight lines, which is to be expected, may also be computed based on the relative velocity known from preceding measuring cycles. The point of intersection of the straight lines, which is the most recent of the three modulation patterns, is reasonably selected to be the "true" value for distance d of the object.

What is claimed is:

1. A method for cyclically measuring distances and relative velocities of at least one object using an FMCW radar sensor, comprising:
    periodically modulating the frequency of a transmitted signal of the radar sensor, each period including at least two differing modulation patterns;

deriving a relationship between distance and velocity of the object from a signal received for a single modulation pattern; and adjusting the signals received, each of the received signals corresponding to a respective one of multiple modulation patterns, to one another in order to determine one value each for the distance and the velocity per each measuring cycle, wherein, for the adjustment between a signal obtained for a modulation pattern in a current measuring cycle and signals obtained for other modulation patterns, at least one signal from at least one previous measuring cycle is utilized.

2. The method as recited in claim 1, wherein each modulation pattern includes a sequence of modulation ramps having the same lift and the same duration.

3. The method as recited in claim 2, wherein a set of ambiguous values is determined for the velocity from the signal for a single modulation pattern based on phase differences between the signals which correspond to the consecutive frequency ramps, and the ambiguity is eliminated by adjusting the signals obtained from different modulation patterns.

4. The method as recited in claim 3, wherein the number of the different modulation patterns is at least three per modulation period.

5. The method as recited in claim 4, wherein each of the at least three different modulation patterns is followed directly by a respective computing time interval.

6. The method as recited in claim 5, wherein:

each period includes at least N differing modulation patterns, the adjustment is performed for signals received over a period according to the N−1 previous measuring cycles and the current measuring cycle, and in each of the measuring cycles for the period, the signals received relate to a different one of the N modulation patterns.

7. The method as recited in claim 3, wherein the transmitted signal is modulated within each measuring cycle according to exactly one modulation pattern.

8. The method as recited in claim 1, wherein the adjustment between the signal obtained for the modulation pattern in the current measuring cycle and the signals obtained for other modulation patterns is performed by determining where a linear relationship between velocity and distance for each of the multiple modulation patterns match.

9. The method as recited in claim 1, wherein the frequency is modulated by chirp sequence modulation.

10. An FMCW radar sensor, comprising:

an oscillator generating a transmitted signal;

a frequency modulation device modulating the frequency of the transmitted signal;

a mixer mixing the transmitted signal with a signal received after a reflection from an object to generate a mixed signal; and a control and evaluation unit evaluating the mixed signal, wherein the control and evaluation unit is configured to:

periodically modulate the frequency of the transmitted signal of the radar sensor, each period including at least two differing modulation patterns;

derive a relationship between distance and velocity of the object from a signal received for a single modulation pattern; and adjust the signals received, each of the received signals corresponding to a respective one of multiple modulation patterns, to one another in order to determine one value each for the distance and the velocity per each measuring cycle, wherein, for the adjustment between a signal obtained for a modulation pattern in a current measuring cycle and signals obtained for other modulation patterns, at least one signal from at least one previous measuring cycle is utilized.

* * * * *